United States Patent [19]
Ellis

[11] 3,741,195
[45] June 26, 1973

[54] THERMOSTATICALLY CONTROLLED WATER SUPPLY SYSTEM

[75] Inventor: Sloan E. Ellis, San Saba, Tex.

[73] Assignee: San Saba Development Association, San Saba, Tex.

[22] Filed: Oct. 13, 1971

[21] Appl. No.: 188,868

[52] U.S. Cl.................. 126/362, 4/192, 236/12 A
[51] Int. Cl............................................. G05d 23/13
[58] Field of Search................... 236/12 R, 12 A; 4/192, 167, 191; 126/362

[56] References Cited
UNITED STATES PATENTS

| | | |
|---|---|---|
| 1,619,234 | 3/1927 | Beebe ..................................... 4/192 |
| 3,091,393 | 5/1963 | Sparrow ............................. 236/12 A |
| 3,348,019 | 10/1967 | Miller ..................................... 4/192 |

*Primary Examiner*—William E. Wayner
*Attorney*—Harvey B. Jacobson

[57] ABSTRACT

A compact, thermostatically controlled water supply system comprising a water heater for supplying hot water through an outlet to a junction with an incoming cold water supply line and a delivery pipe, a flow valve located in one of the lines responsive to the temperature of water flowing through the delivery pipe to control the ratio of cold and hot water mixed at the junction, and pedal-actuated valve in the delivery pipe to permit the flow of mixed water to the lavatory.

5 Claims, 4 Drawing Figures

THERMOSTATICALLY CONTROLLED WATER SUPPLY SYSTEM

The present invention is generally related to lavatories and, more particularly, to lavatories including hot water heaters or the like.

In the past, a variety of hot water supply systems have been provided for lavatories and water basins. Such systems have offered means for controlling the water temperature by way of mixing through a pair of manually adjustable valves. In public lavatories, however, it has been necessary to provide automatic shut-off systems such as a single spring-loaded valve in order to assure shut off after each use. Such systems, which are often utilized in service stations and restaurants, do not include means for controlling the water temperature and, in many cases, provide water that is either too cold or too hot. It is desirable, therefore, to provide a water supply system for public lavatories and the like which includes both automatic shut off and water temperature control together with means for furnishing an ample supply of warm water to the wash basin.

It is an object of the present invention to provide a novel water supply system including means for mixing a flow of hot or heated water with cold or unheated water in a thermostatically controlled manner, thereby automatically maintaining the supplied water within a predetermined temperature range.

Another object of the present invention is to provide an unique lavatory water supply system including hot and cold water supply lines joined together at a common connection with a thermostatically controlled valve mounted in one of the lines to control the ratio of the hot water to cold water mixture, thereby automatically maintaining the temperature of the mixture within predetermined limits.

It is a further object of the present invention to provide a versatile water supply system for public lavatories and the like including a thermostatically controlled supply of water, which is effected by way of a foot actuated valve which is normally closed, thereby leaving a user's hands free for washing and the like.

Still another object of the present invention is to provide a novel water supply system which includes both automatic temperature and shut-off control together with a compact water heater adapted to fit beneath the lavatory, the system being extremely compact, durable and long-lasting, yet, relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
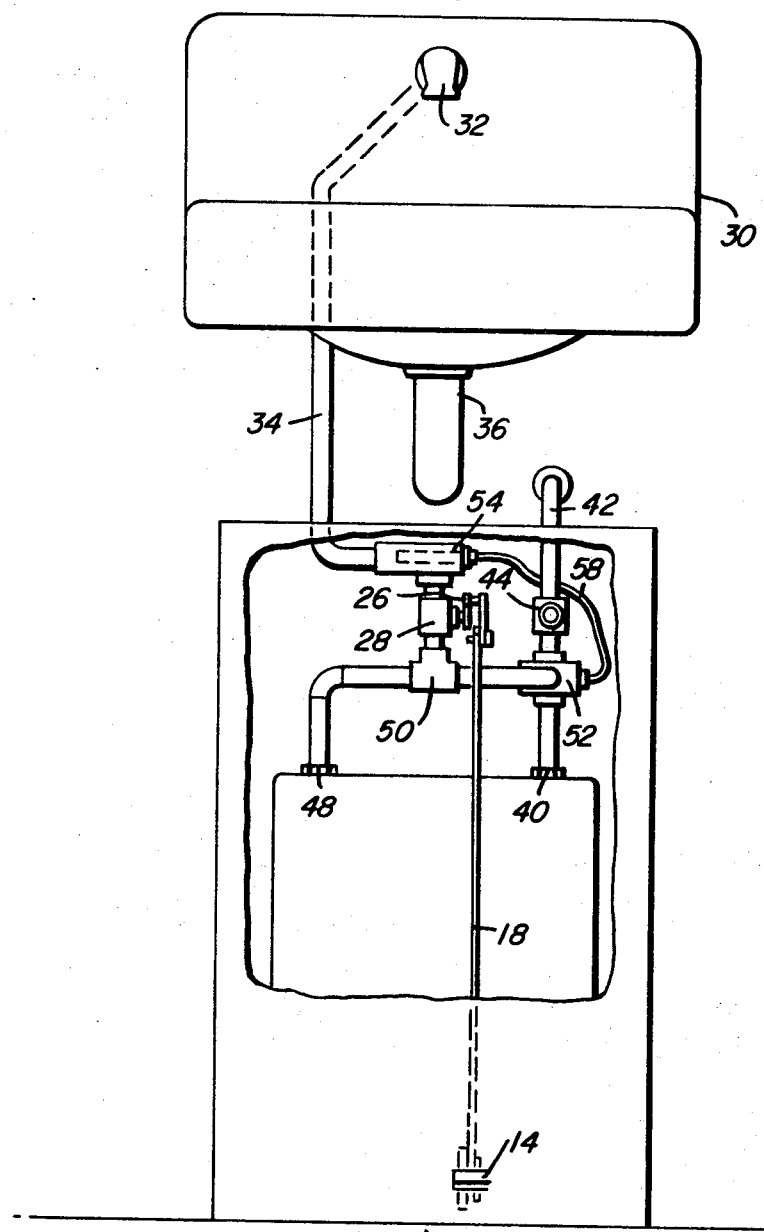
FIG. 1 is an elevational view of the water supply system of the present invention connected to a typical lavatory with sections removed.
Figure 2:
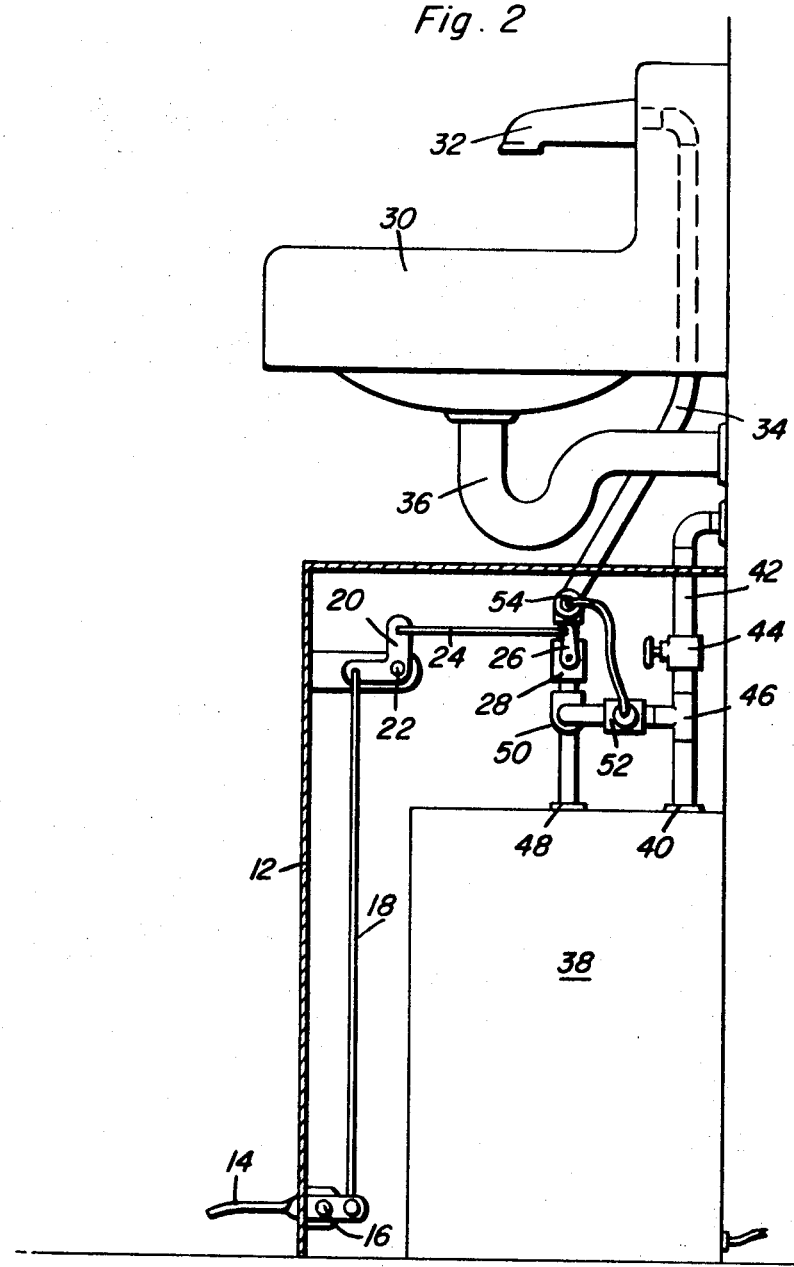
FIG. 2 is a side elevational view of the water supply system illustrated in FIG. 1.

Referring now, more particularly, to FIGS. 1 and 2, the thermostatically controlled water supply system is generally indicated by the numeral 10 and is provided with a generally rectangular housing 12 with a foot pedal 14 extending therefrom for convenient manipulation by a user. The foot pedal is pivotally connected to the housing at 16 to effect a reciprocal movement of a vertical linkage 18 pivotally connected to one end of the foot pedal. The top end of linkage 18 is operatively connected to a motion transfer link 20 which is pivotally mounted at 22 to housing 12. Vertical reciprocation of linkage 18 is transmitted to a second linkage 24 extending between link 20 and a valve operator 26 associated with an on-off valve 28. Preferably, valve 28 is one of several conventional types and is normally in a closed position such that no liquid will flow through the pipes associated therewith.

A lavatory or wash basin, of a conventional type, is indicated by the numeral 30 and includes an outlet 32 connected to valve 28 by way of a delivery pipe 34. Preferably, lavatory 30 is provided with a drain pipe 36 of a conventional type. The lavatory, outlet and drain pipe are not intended to form a part of the present invention, such being of a conventional design or construction.

The water supply system of the present invention is provided with a hot water heater 38, preferably, of the electrical type and of compact construction, such that it may be conveniently located beneath the lavatory in an unobtrusive manner. The hot water heater is provided with an inlet 40 which is connected to a cold water supply pipe 42 through a manual valve 44 and a T-type connection 46. Hot water is provided for the system through outlet 48 which is coupled to a water-mixing junction 50 which may be T-shaped such as that at 46. One outlet of T connection 46 is connected to junction 50 by way of a temperature responsive flow valve 52. Valve 52 is responsive to a temperature sensor 54 mounted in heat transfer relationship to the water flowing through a delivery pipe 34. As cold water flows through supply pipe 42 to water heater 38, it also is mixed with hot water at junction 50 in a proportion dependent upon the opening of temperature responsive flow valve 52. Thus, it will be appreciated that as the temperature of the water passing through delivery pipe 34 increases, valve 52 is effective to add an increased amount of cold water to the mixture such that the temperature of the mixed water is maintained within predetermined limits.

Figure 3:
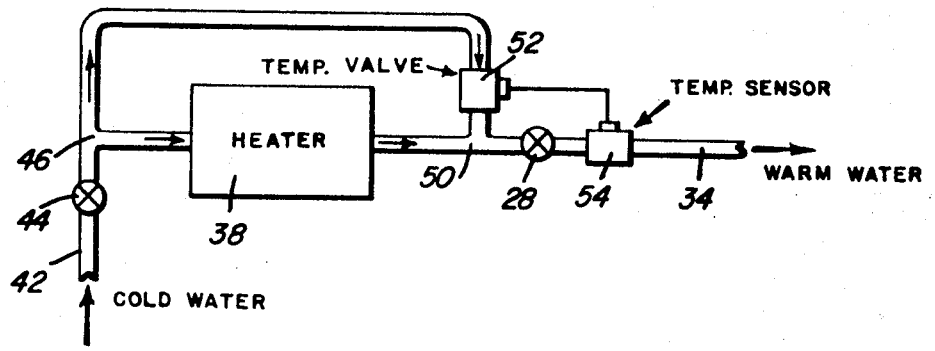
FIG. 3 is a flow diagram of the water supply system of the present invention.

Referring to FIG. 3, the operation of the water supply system of the present invention may be seen in more simplified form. Operation of the system may be explained as follows. Assuming that temperature responsive valve 52 is in the closed position, as it would be if the system had not been used for several hours, actuation of valve 28 by the foot pedal permits the flow of water from heater 38 through delivery pipe 34. Initially, this water will be at approximately room temperature. In a matter of seconds, however, the pipes are cleared and hot water flows through the delivery pipe 34.

If the temperature of the hot water exceeds predetermined temperature limits, temperature sensor 54 is effective to actuate temperature valve 52 to mix cold water at junction 50, as hereinafter explained. The amount of cold water introduced into the hot water supply is dependent upon the temperature detected at sensor 54. If an extremely hot temperature is sensed, such as that which might normally burn one's hands, the sensor is effective to fully open valve 52 to permit a substantially unobstructed flow of cold water to junction 50.

It will be appreciated that, if desired, the temperature valve may be inserted into the hot water supply line emanating from a heater 38 to attenuate the flow of hot water through delivery pipe 34 in the event of mixed water temperatures beyond predetermined limits. It should be noted that when utilizing the temperature valve in the hot water supply line, such a valve would be of the type which operates in a reverse manner to that utilized in the cold water supply line and that illustrated in FIG. 4. It should also be noted that by inserting the temperature responsive valve in the cold water supply line, rather than the hot water supply line, the efficiency of the heating system is not significantly diminished by an excessive addition of cold water to the hot water. Such, of course, is dependent to some extent upon the proper sizing of the hot water heater to provide the most desirable output temperature.

Figure 4:
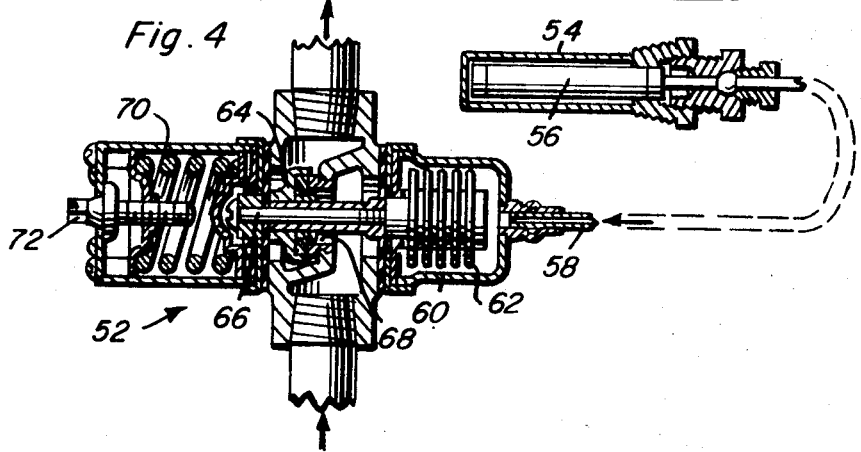
FIG. 4 is a sectional view of the temperature responsive flow valve associated with the present invention.

Referring to FIG. 4, the temperature responsive valve and sensor associated with the present invention may be seen in more detail. Preferably, temperature sensor 54 includes a temperature bulb 56 containing an expansible fluid of a conventional type which is effective to transmit pressure generated within the temperature bulb to temperature responsive valve 52 by way of a tubing connection 58. The valve includes a sealed housing 60 surrounding a bellows 62 communicated with tube 58. A valve member 64 is mounted for reciprocation to valve stem 66 operatively connected to the bellows structure such that the opening to fluid passageway 68 may be varied, thereby controlling the rate of fluid flow through the valve. The valve is normally in the closed position under the influence of a biasing spring 70, the force of which may be adjusted by way of a threaded member 72. It will be appreciated that as the temperature sensed by bulb 56 increases, a pressure generated within housing 60 is effective to move bellows 62 to the left, as shown in FIG. 4, to open the valve and permit fluid flow therethrough. The greater the temperature sensed, the greater is the opening and, thus, the greater is the rate of fluid flow through the valve. By adjusting biasing spring 70, the temperature at which the valve opens may be accurately set, thereby controlling the maximum temperature of the water mixture passing through delivery pipe 34.

As mentioned above, it is possible to provide the system with a temperature valve in the hot water line, rather than the cold water supply line. However, it should be noted that such a valve structure, while similar to that illustrated in FIG. 4 would operate in a reverse manner, or in other words, the valve would be influenced toward closure upon increased temperatures sensed by bulb 56.

From the foregoing description, it will be appreciated that the thermostatically controlled water supply system of the present invention provides a versatile means which permits a user to obtain a flow of water to a lavatory or wash basin through the actuation of a foot pedal, thereby leaving his hands free for washing or the like. Furthermore, the temperature of the water is thermostatically controlled within predetermined limits such that a user will not burn his hands with extremely hot water, but will be furnished with a continuous flow of water within a most desirable temperature range. Since the hot and cold water flows are produced from a common pressure source, changes in supply pressure will not affect the mixture temperature. It should be noted that after a user leaves the lavatory area, the flow of water is automatically terminated by return of the foot pedal operated valve to its normally closed position. This assures that the heater water is not wasted, and, in most cases, that sufficient hot water remains within the system for subsequent user.

It should be noted that the hot water heater and associated valves may be located remote from the wash basin if so desired. However, due to the extremely compact construction of the system such may be conveniently installed beneath a wash basin without obstructing movement therearound. It will also be appreciated that the water supply system of the present invention provides an unique means of hot water supply for customers in service stations and restaurants, especially those which are not equipped with conventional hot water heating systems. The relative simplicity of the system and the ease with which it can be installed results in relatively low manufacturing and installation costs. It should be noted that minor changes in valve locations or pipe fittings or the structure of the temperature responsive valve are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A water supply system for use with lavatories, said system including cold water supply means for furnishing a flow of cold water through a first line, a water heater having an inlet connected to said first line to receive a flow of cold water therethrough and an outlet for supplying heated water to a second water line, means connected to said first and second lines for mixing the heated water with the cold water for flow through a delivery pipe, temperature responsive valve means in one of said lines for controlling the rate of flow therethrough to effect the ratio of mixture of the heated and cold water, temperature sensing means in heat transfer relation with the water in said delivery pipe and being connected to said temperature responsive valve means to maintain the temperature of the water passing through said delivery pipe within predetermined limits, manual valve means in said delivery pipe for controlling the flow of mixed water therethrough and being movable between a normally closed position and an opened position, and pedal means located adjacent the lavatory for selectively acuating said manual valve means toward its opened position to provide a flow of temperature controlled mixed water to the lavatory.

2. The structure set forth in claim 1 wherein said system includes a housing adapted to fit beneath the lavatory and including means for supporting said pedal means to permit operative manipulation thereof.

3. The structure set forth in claim 2 wherein said housing at least partially surrounds said heater and said valves.

4. The structure set forth in claim 1 wherein said temperature sensing means includes a temperature responsive pressure generating means and said temperature responsive valve means includes pressure responsive means operatively connected to said pressure generating means for controlling the flow of water through the association line.

5. The structure set forth in claim 4 wherein said means for mixing the heated and cold water includes T connection between said first and second lines and said delivery pipe.

* * * * *